June 4, 1968 K. E. BURG 3,386,526
MULTIPLE SHORT STREAMER MARINE SEISMIC DETECTOR SYSTEM
Filed Dec. 6, 1965
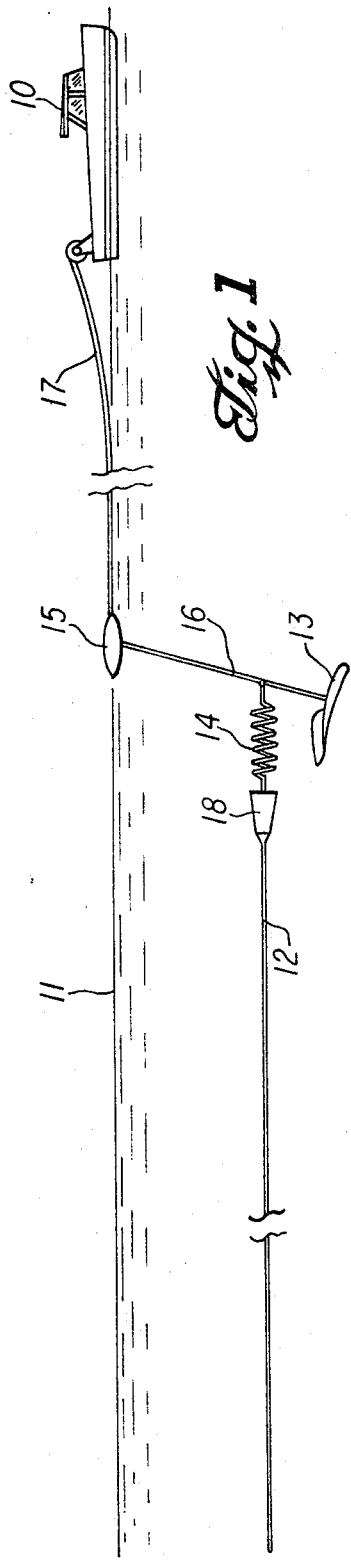
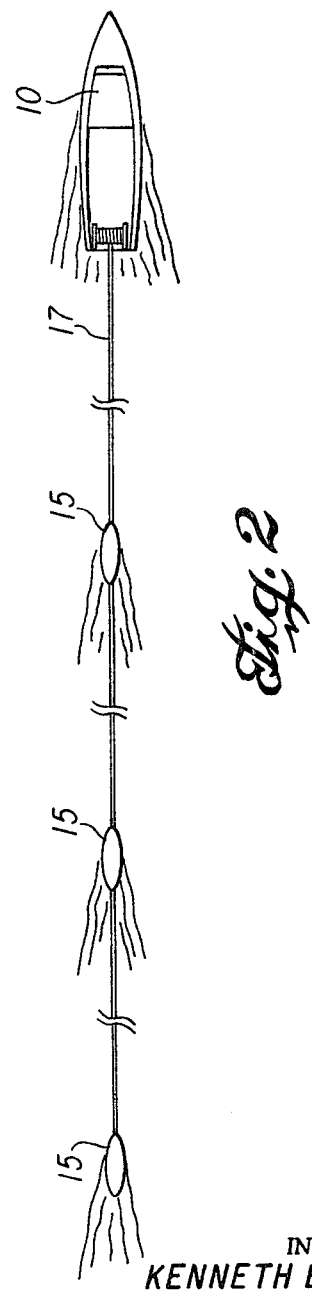
INVENTOR
KENNETH E. BURG
BY V. Lawrence Sewell
ATTORNEY United States Patent Office 3,386,526
Patented June 4, 1968

3,386,526
MULTIPLE SHORT STREAMER MARINE
SEISMIC DETECTOR SYSTEM
Kenneth E. Burg, Dallas, Tex., assignor to Texas Instruments Incorporated, Dallas, Tex., a corporation of Delaware
Filed Dec. 6, 1965, Ser. No. 511,677
5 Claims. (Cl. 181—.5)

ABSTRACT OF THE DISCLOSURE

A marine seismic detector system is disclosed which comprises a plurality of separate short streamers that are substantially in line with the output of each streamer being representative of information of one seismic data channel. Each streamer is connected to an acoustic insulator, a paravane and float, while the float, in turn, is connected to a towing boat via a seismometer cable.

Marine seismic detectors are commonly arranged in marine streamers to be towed through the water by a ship. In order that the electrical signals produced by the detectors give a more accurate indication of geological structures, it is desirable that the streamers maintain a constant depth beneath the surface of the water. Moreover, the disturbance of the detectors by water turbulence and other noise should be minimized.

It is therefore an object of the invention to provide a marine seismic detector system.

Another object of the invention is to provide a marine seismic detector system exhibiting depth control.

It is also an object of the invention to provide a marine seismic detector system having noise reduction features.

In accordance with one embodiment of the invention, a ship tows a plurality of surface floats, each of which pulls a submerged paravane and a seismic detecting streamer, said streamer having an acoustic insulator at its forward end and said streamer being electrically connected with the ship by way of the acoustic insulator, appropriate cabling and a float.

Other objects, features, and advantages of the invention will be more readily understood from the following detailed description when read in conjunction with the appended claims and attached drawing, in which:

FIGURE 1 illustrates one streamer assembly of the marine seismic detector system of the invention as towed in the water by a ship.

FIGURE 2 is a plan pictorial view of the system of the invention, showing the arrangement of multiple streamer assemblies.

In FIGURE 1, the seismic detector system of the invention is shown as being towed by a ship 10. The system is partially submerged and partially at the surface 11 of the water. The detecting elements of the system of the invention are a plurality of pressure sensitive seismic streamers like streamer 12 of the drawing. Although only one streamer is shown in FIGURE 1, the interconnection of multiple streamers is described below in connection with FIGURE 2.

Conventionally a seismic streamer is composed of multiple streamer sections, towed one behind the other through the water. Each section has a number of seismometers distributed along the length thereof and contained within the flexible streamer section wall, which is of a cylindrical shape. All the seismometers in each section are electrically connected in parallel, and the conductors bearing the composite output from each section reach the recording ship by passing through the intervening streamer sections. Because the length of the combined sections may be as much as 8000 feet, the streamer sections must also contain strain bearing wires, so that forward sections may bear the force of towing the sections which follow. The streamer 12 differs from the streamer described above in that it is much shorter, being the length of one or several of the individual streamer sections referred to above. The length of the streamer 12 may be, for example, 50 feet. For most applications, all the seismometers of streamer 12 would be connected in parallel, just as in the individual streamer sections previously described. Streamer 12 differs from the sections of the long streamer in that there is no requirement for the streamer to carry conductors from seismometers other than those contained therein. The streamer 12 does not need strain elements due to its short length. Because of the absence of extra conductors and strain elements, the streamer 12 may further differ from the long streamer by being of smaller diameter. The streamer is just large enough to encircle each of the seismometers, for example, one inch in outside diameter, as compared with approximately three inches for the long streamer. Thus, streamer 12 is like the individual sections of the long streamer but is free of strain elements and extra conductors, and hence is of significantly smaller diameter.

The streamer assembly of FIGURE 1 is towed by ship 10 by means of seismometer cable 17. Cable 17 may be the commonly used floating rod type marine cable. In addition to strain bearing elements, cable 17 contains electrical conductors for the transmission of signals from the seismometers of the streamer to instruments on ship 10. If cable 17 is of the floating rod type, the conductors and strain members are encased in a foam material to float on the surface 11 of the water. Connected to cable 17 is a surface float 15. Float 15 may be, for example, one of those manufactured for seismic purposes by Seismic Engineering Company, Dallas, Tex.

A paravane 13 is connected to surface float 15 by tow cable 16. Paravane 13 is capable of maintaining an adjustable constant depth while being towed through the water at varying speeds. The V-Fin® manufactured by Braincon, Marion, Mass., is suitable for use as paravane 13. The tow cable 16 may be streamlined for less turbulent passage through the water by the use of fairing.

Streamer 12 is connected to tow cable 16 by an acoustic insulator 14. Acoustic insulator 14 is an elastic section which serves to insulate streamer 12 from vibrations at cable 16. A sea anchor 18 attached to insulator 14 creates a drag on the insulating section to maintain it under tension, thereby assuring the most effective insulating action. A commercially available acoustic insulator may be employed for insulator 14, such as one of those manufactured by Chesapeake Instrument Corporation, Shadyside, Md.

To connect streamer 12 with seismometer cable 17 electrically, acoustic insulator 14, tow cable 16 and surface float 15 each have conductors therein. The conductors from streamer 12 are connected to those of acoustic insulator 14, and those of insulator 14 are connected to the conductors in cable 16, which are connected by means of the wires in float 15 to cable 17.

FIGURE 2 illustrates the combination of several streamer assemblies to form the system of the invention. Seismometer cable 17 has attached to it multiple surface floats 15. Each float 15 tows a paravane and streamer combination like that of FIGURE 1, each streamer being substantially in line. Seismometer cable 17 may be divided, as shown in FIGURE 2, with the floats 15 inserted between the sections thereof, or it may be continuous, having each float attached thereto with a connecting cable. Seismometer cable 17 has conductors therein corresponding to each float for transmitting to ship 10 the electrical signals from the streamer associated with the float.

The depth of each streamer 12 is controlled by the action of the associated paravane 13. The paravane maintains a constant depth, and thereby holds at a constnt depth the end of streamer 12 attached to cable 16. For a long streamer, such control would not suffice to maintain the other end of the streamer at a constant depth, because of the many flexible intervening sections. For so short a streamer as streamer 12, the action of the streaming forces due to motion of the streamer through the water is sufficient to hold the trailing end thereof at the depth of the leading end. Thus, it is the use of many short streamers rather than a long streamer which results in the depth control provided by the system of the invention. Other arrangements of the short streamer 12 are also capable of producing the depth control. For example, acoustic insulator 14 may be connected directly to paravane 13 rather than cable 16. Or paravane 13 may be replaced by a lightly weighted cable connecting float 15 and insulator 14. In the latter case, the length of the weighted cable determines the depth of the streamer's leading end, and the depth of the trailing end is controlled by streaming forces.

When all the seismometers of each streamer 12 are connected in parallel to produce a composite output for the streamer, it may be desirable to change the length of each streamer to obtain changed directionally characteristics for the detector system. This can readily be done with no need for inserting or removing spacing sections in the streamer as with the long, prior art streamer. When the length of the streamers 12 increases above about five hundred feet, depending on the weight of the streamers, there arises the need for strain bearing wires to pull the weight of such a long streamer. The detrimental noise effects of adding strain wires is discussed below. Further, when the wires are added, further increasing the weight of the streamer, both strain and depth problems rapidly increase. Thus, to derive fully the benefits provided by the invention, the length of streamer 12 should be kept in the range below about five hundred feet. Where the seismometers in each streamer are connected in parallel, there is little requirement for more directionality than is provided by a streamer 12 of about three hundred feet. At such a length, strain members are not required, and depth is controlled by streaming forces, as described.

The noise characteristics of the streamer 12 are improved because of the absence of strain bearing wires running through the streamer. When strain wires are present, they serve to transmit acoustic vibrations in the streamer. A smaller diameter streamer, without strain members is quieter. Noise is further reduced by the use of acoustic insulator 14. Each streamer is acoustically insulated from the paravane 13 and the ship 10. Moreover, since the streamer assemblies of the invention are separated from one another, although substantially in line each streamer is acoustically insulated from the other streamers. Since the absence of strain wires in streamer 12 is made possible by the use of such a short streamer, one of the noise reduction features of the invention is indirectly a result of the short streamer length.

It is to be understood that the above-described embodiment is merely illustrative of the application of the principles of the invention. Numerous other arrangements may be devised by those skilled in the art without departing from the spirit and scope of the invention as defined by the appended claims.

What is claimed is:

1. A marine seismic detector system for use with a ship to detect a plurality of channels of seismic signal data comprising:
    a seismometer cable having a plurality of longitudinally spaced apart surface floating means adapted to be towed by said ship and having electrical circuits leading to said ships,
    a plurality of submerged seismic detecting streamers, said streamers being mechanically coupled to said floating means on a one-to-one basis and electrically connected to a circuit in said cable with the leading ends of said streamers at constant depth in tandem behind said ship for generating and transmitting seismic signals to said ship, and
    paravane means installed spaced from said floating means at the leading end of each of said streamers.

2. A marine seismic detector system as set forth in claim 1, wherein an acoustic insulator connects the head of each of said streamers to said cable.

3. A marine seismic detector system as set forth in claim 1 wherein an acoustic insulator connects the head of each of said streamers to the paravane associated therewith.

4. A marine seismic detector system as set forth in claim 1, wherein said streamers are less than five hundred feet in length.

5. A marine seismic detector system as set forth in claim 1, wherein each of said streamers includes multiple seismic detectors, electrically interconnected to produce a composite output from the streamer.

References Cited

UNITED STATES PATENTS

| | | | |
|---|---|---|---|
| 793,896 | 7/1905 | Mundy | 340—7 |
| 1,378,960 | 5/1921 | Horton | 340—7 |
| 2,241,428 | 5/1941 | Silverman | 181—0.5 |
| 2,551,417 | 5/1951 | Carlisle | 340—7 |
| 2,572,255 | 10/1951 | Gallaway | 340—7 |
| 2,757,356 | 7/1956 | Haggerty | 340—7 |
| 2,798,211 | 7/1957 | Smith | 340—7 X |
| 2,807,793 | 9/1957 | Bayhi | 340—7 X |
| 2,923,916 | 2/1960 | Woodworth | 340—7 X |
| 3,187,831 | 6/1965 | Smith | 181—0.5 |
| 3,287,691 | 11/1966 | Savit | 340—7 |

BENJAMIN A. BORCHELT, *Primary Examiner.*

W. KUJAWA, *Assistant Examiner.*